(12) United States Patent
Jonsson et al.

(10) Patent No.: US 8,953,576 B2
(45) Date of Patent: Feb. 10, 2015

(54) HANDLING REDUNDANT DATA IN A COMMUNICATION SYSTEM

(71) Applicant: Telefonaktiebolaget L M Ericsson (publ), Stockholm (SE)

(72) Inventors: Anders Jonsson, Täby (SE); Nianshan Shi, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/123,383

(22) PCT Filed: Oct. 31, 2012

(86) PCT No.: PCT/SE2012/051179
§ 371 (c)(1),
(2) Date: Dec. 2, 2013

(87) PCT Pub. No.: WO2013/066252
PCT Pub. Date: May 10, 2013

(65) Prior Publication Data
US 2014/0098747 A1 Apr. 10, 2014

Related U.S. Application Data

(60) Provisional application No. 61/556,012, filed on Nov. 4, 2011.

(51) Int. Cl.
*H04W 28/04* (2009.01)
*H04L 1/02* (2006.01)
*H04L 1/18* (2006.01)
*H04W 88/08* (2009.01)
*H04W 88/12* (2009.01)

(52) U.S. Cl.
CPC ............... *H04W 28/04* (2013.01); *H04L 1/02* (2013.01); *H04L 1/1874* (2013.01); *H04L 1/1896* (2013.01); *H04W 88/08* (2013.01); *H04W 88/12* (2013.01)
USPC ............ 370/338; 370/394; 370/400; 455/436

(58) Field of Classification Search
None
See application file for complete search history.

(56) References Cited

U.S. PATENT DOCUMENTS

| | | | | |
|---|---|---|---|---|
| 6,621,796 B1* | 9/2003 | Miklos | | 370/236 |
| 2006/0193276 A1* | 8/2006 | Sakata | | 370/310 |
| 2008/0298332 A1* | 12/2008 | Erami | | 370/338 |

(Continued)

OTHER PUBLICATIONS

Author Unknown, "Considerations on Choice of Data Split Options for Inter-NB-Multi-Flow Transmission," Huawei, HiSilicon; 3GPP TSG RAN2 Meeting #75bis; R2-114900; Oct. 10-14, 2011. Zhuhai, China.

(Continued)

*Primary Examiner* — Chi H Pham
*Assistant Examiner* — Shick Hom
(74) *Attorney, Agent, or Firm* — Murphy Bilak & Homiller, PLLC

(57) ABSTRACT

Explicit discard indications are used that allows a radio network controller (105), when operating in a multi-point High Speed Downlink Packet Access, HSDPA, scenario, to send data to a user equipment (106) via plural radio base stations (104) while reducing the risk for unnecessary duplicate data to be sent over the Uu interface between the radio base stations and the user equipment.

11 Claims, 8 Drawing Sheets

(56) References Cited

U.S. PATENT DOCUMENTS

2010/0135221 A1* 6/2010 Komura .................. 370/329
2010/0153809 A1* 6/2010 Duan et al. ................ 714/751

OTHER PUBLICATIONS

3rd Generation Partnership Project, "3GPP TR 25.872 V11.0.0 (Sep. 2011)," 3rd Generation Partnership Project; Technical Specification Group Radio Access Network; High Speed Packet Access (HSDPA) multipoint transmission (Release 11). Sep. 2011. pp. 1-29.

Author Unknown, "Flow Control improvements in Multi Point Operation," Ericsson; 3GPP TSG-RAN WG3 Meeting #76; R3-121287; May 21-25, 2012. pp. 1-12. Paruge, Czech Republic.

Author Unknown, "Layer 2 considerations for Inter-Node Multipoint HSDPA operation," InterDigital; 3GPP TSG-RAN WG2 Meeting #74; R2-113299; May 9-13, 2011. pp. 1-4. Barcelona, Spain.

3rd Generation Partnership Project, "3GPP TS 25.435 V 10.3.0 (Sep. 2011)," 3rd Generation Partnership Project; Technical Specification Group Radio Access Network; UTRAN Iub interface user plane protocols for Common Transport Channel data streams (Release 10). Sep. 2011. pp. 1-61.

3rd Generation Partnership Project, "3GPP TS 25.425 V10.1.0 (Jun. 2011)," 3rd Generation Partnership Project; Technical Specification Group Radio Access Network; UTRAN Iur interface user plane protocols for Common Transport Channel data streams (Release 10). Jun. 2011. pp. 1-49.

3rd Generation Partnership Project, "3GPP TS 25.401 V3.2.0 (Mar. 2000)," 3rd Generation Partnership Project; Technical Specification Group Radio Access Network; UTRAN Overall Description (Release 1999). Mar. 2000. pp. 1-35.

* cited by examiner

HANDLING REDUNDANT DATA IN A COMMUNICATION SYSTEM

TECHNICAL FIELD

The present disclosure relates to handling redundant data communicated between different entities in a radio access network, such as radio base stations and radio network controllers.

BACKGROUND

The third generation partnership project, 3GPP, is currently working on specifying support for MP HSDPA (Multi-Point High-Speed Downlink Packet Access) in Release-11. When MP HSDPA is employed, downlink data is sent to UE (User Equipment, also referred to as mobile/wireless terminal) via two instead of one Node B (herein also referred to as radio base station, RBS). The UE will thus receive data via two MAC-hs (HSDPA Medium Access Control protocol handling fixed size RLC data) or MAC-ehs (HSDPA Medium Access Control protocol handling fixed or flexible sized RLC data) flows and re-order data on RLC (Radio Link Control) level for delivery to higher layers. It should be noted that various terminology has been used to describe this functionality in 3GPP such as HSDPA Multipoint Transmission, Inter-NodeB Multi-Point Transmissions and HSDPA Multiflow data but the abbreviation MP HSDPA will henceforth be used to describe this functionality.

A potential problem with some existing MP HSDPA solutions is that since data in the UE may be received from more than one Node B, then the data as delivered to the RLC layer in UE may be out of order. Since the RLC layer in UE will trigger a status report when missing RLC SN (Sequence Number) is detected, this will lead to unnecessary RLC retransmissions if the missing data has already been sent to the other Node B but not yet transmitted to UE. The unnecessary retransmissions this will cause will in turn result in that one or both Node B's will buffer and eventually transmit redundant data to the UE.

Various solutions to this problem on RLC level have been suggested as outlined in 3GPP reference R2-113299, "Layer 2 considerations for Inter-Node Multipoint HSDPA operation", but these may not reduce/eliminate the problem of redundant data. To this it can be added that in a MP HSDPA there may even be multiple copies of the same MAC-d (Medium Access Control protocol handling dedicated data) PDU's (Protocol Data Units) in one or both Node B PQ's (Priority Queues) since the UE may via RLC status reports sent requests for additional retransmissions for data already queued in Node B but not yet transmitted.

Although this may not necessarily cause a protocol failure, it is detrimental in that it can lead to an inefficient use of available air interface resources in existing solutions because this redundant data may need to be sent to UE before it is discarded.

SUMMARY

In order to enable a more efficient use of air interface resources, there are provided methods, apparatuses and computer program products in several aspects. Hence, there is provided in a first aspect of the invention a method in a radio network controller. The radio network controller is configured for multi-point HSDPA operation wherein data is communicated to a first user equipment via at least two radio base stations. The method comprises transmitting a discard indication signal to at least one of the at least two radio base stations. The discard indication signal includes a first data frame sequence number. The discard indication signal indicates to the at least one radio base station that MAC-d PDUs received by the at least one radio base station from the radio network controller in a data frame associated with the first data frame sequence number can be discarded.

In a second aspect of the invention there is provided a method in a radio base station. The radio base station is configured to participate in multi-point HSDPA operation wherein data is communicated to a first user equipment via the radio base station and at least one other radio base station. The method comprises receiving MAC-d PDUs from a radio network controller in data frames, wherein each data frame conveying MAC-d PDUs is associated with a sequence number. The received MAC-d PDUs are buffered in a buffer pending transfer to the first user equipment. A discard indication signal is received from the radio network controller. The received discard indication signal includes a data frame sequence number and the discard indication signal indicates to the radio base station that MAC-d PDUs received by the radio base station in a data frame associated with said sequence number can be discarded.

In a third aspect of the invention there is provided a radio network controller. The radio network controller is configurable for multi-point HSDPA operation wherein data is communicated to a first user equipment via at least two radio base stations. The radio network controller comprises digital data processing circuitry adapted to generate a discard indication signal for transmission to at least one of the at least two radio base stations. The discard indication signal includes a first data frame sequence number and the discard indication signal indicates to the at least one radio base station that MAC-d PDUs received by the at least one radio base station from the radio network controller in a data frame associated with the first data frame sequence number can be discarded. The radio network controller further comprises a transmitter operable connected to the digital data processing circuitry. The transmitter is adapted to transmit the generated discard indication signal to the at least one of the at least two radio base stations.

In a fourth aspect of the invention there is provided a radio base station. The radio base station is configurable to participate in multi-point HSDPA operation wherein data is communicated to a first user equipment via the radio base station and at least one other radio base station. The radio base station comprises a receiver arranged to receive MAC-d PDUs from a radio network controller in data frames, wherein each data frame conveying MAC-d PDUs is associated with a sequence number. The radio base station further comprises digital data processing circuitry that is operable connected to the receiver and arranged to buffer the received MAC-d PDUs in a buffer pending transfer to the first user equipment. The receiver is further arranged to receive a discard indication signal from the radio network controller. The discard indication signal includes a data frame sequence number and the discard indication signal indicates to the radio base station that MAC-d PDUs received by the radio base station in a data frame associated with said sequence number can be discarded.

In a fifth aspect of the invention there are provided non-transitory computer program products comprising software instructions that are configured, when executed in a processor, to perform the method of the first and second aspects.

That is, embodiments of the invention make use of an explicit discard indication that allows the radio network controller, when operating in a MP HSDPA scenario, to send data to a user equipment via plural radio base stations while reducing the risk for unnecessary duplicate data to be sent over the Uu interface. Since the capacity to convey data via different radio base stations varies over time due to variations in both the transport network and radio conditions, it may be advantageous if retransmissions can be done over the radio base station link that has the greatest capacity at the time of retransmission. With such discard indications, redundant copies of MAC-d PDU's can be discarded before transmission over the Uu interface thereby saving Uu bandwidth.

DETAILED DESCRIPTION

Figure 1:
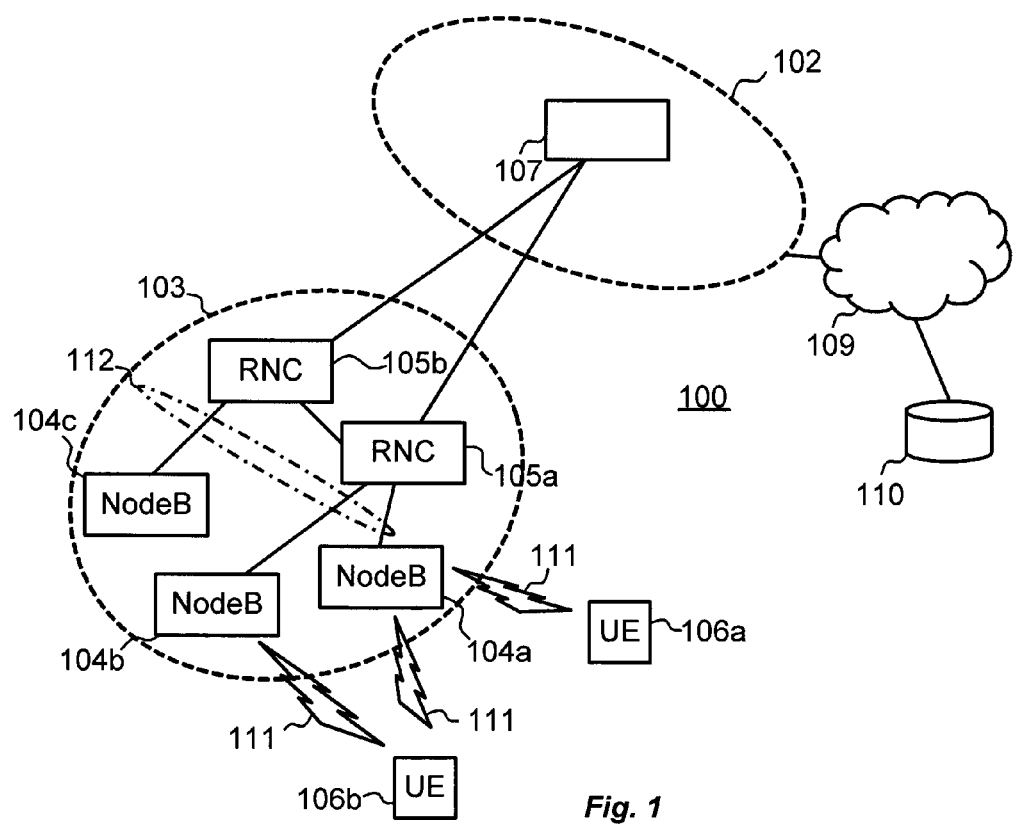
FIG. 1 illustrates schematically a mobile communication system.

FIG. 1 illustrates schematically a mobile communication system in the form of a cellular network 100 in which the present methods and apparatuses can be implemented. The cellular network 100 in FIG. 1 is exemplified by a universal mobile telecommunications system, UMTS. It should be noted, however, that the skilled person will readily be able to perform implementations in other similar communication systems involving transmission of coded data between nodes.

In FIG. 1 the cellular network 100 comprises a core network 102 and a UMTS terrestrial radio access network, UTRAN, 103. The UTRAN 103 comprises a number of nodes in the form of radio network controllers, RNC, 105a, 105b, each of which is coupled via a so-called transport network, TN, 112, to a set of neighbouring nodes in the form of one or more NodeB 104a, 104b, 104c. Each NodeB 104 is responsible for a given geographical radio cell and the controlling RNC 105 is responsible for routing user and signalling data between that NodeB 104 and the core network 102. All of the RNCs 105 are coupled to one another. Signaling between the Node Bs and the RNCs includes signalling according to the Iub interface. A general outline of the UTRAN 103 is given in 3GPP technical specification TS 25.401 V3.2.0.

FIG. 1 also illustrates communicating entities in the form of mobile devices or user equipment, UE, 106a, 106b and radio base stations in the form of NodeBs 104a, 104b, 104c. A first UE 106a communicates with a first NodeB 104a via an air interface 111 and a second UE 106b communicates with the first NodeB 104a and with a second NodeB 104b via the air interface 111. Signalling in the air interface 111 includes signalling according to the Uu interface. As will be elucidated in some detail below, the UEs 106b operates by utilizing MP-HSDPA in relation to the two NodeB's 104a and 104b.

The core network 102 comprises a number of nodes represented by node 107 and provides communication services to the UEs 106 via the UTRAN 103, for example for communication between UEs connected to the UTRAN 103 or other mobile or fixed networks and when communicating with the Internet 109 where, schematically, a server 110 illustrates an entity with which the mobile devices 106 may communicate. As the skilled person realizes, the network 100 in FIG. 1 may comprise a large number of similar functional units in the core network 102 and the UTRAN 103, and in typical realizations of networks, the number of mobile devices may be very large.

Figure 2:
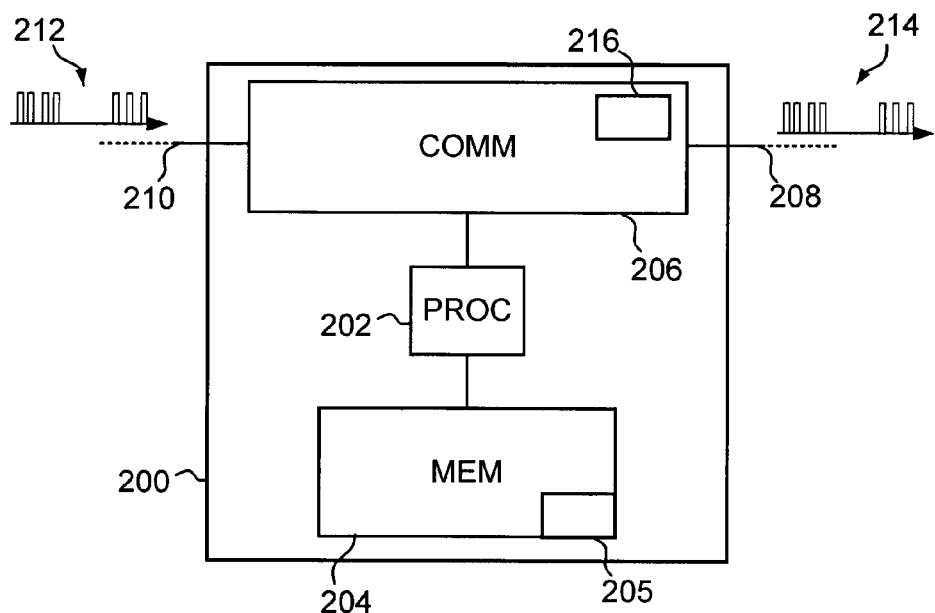
FIG. 2 illustrates schematically a radio base station.

FIG. 2 is a functional block diagram that schematically illustrates an example of a radio network controller, RNC, 200 that is configured to operate in a radio access network, such as the UTRAN 103 in FIG. 1. In the embodiment of FIG. 2, the RNC 200 represents a RNC, such as any of the RNC's 105 in FIG. 1.

The RNC 200 comprises digital data processing circuitry comprising processing means, memory means and communication means in the form of a processor 202, a memory 204 and communication circuitry 206 that includes a transmitter 216 capable of transmitting data to other entities in the network. For example, the circuitry of these means 202, 204 and 206 can comprise and/or form part of one or more application specific integrated circuit, ASIC, as well as one or more digital signal processor, DSP. The RNC 200 receives data 212 via an incoming data path 210 and transmits data 214 via an outgoing data path 208. The data 210, 212 can be any of uplink and downlink data, as the skilled person will realize.

Methods to be described below can be implemented in the RNC 200. In such embodiments, the method actions are realized by means of software instructions 205 that are stored in the memory 204 and are executable by the processor 202. Such software instructions 205 can be realized and provided to the RNC 200 in any suitable way, e.g. provided via the networks 102, 103 or being installed during manufacturing, as the skilled person will realize. Moreover, the memory 204, the processor 202, as well as the communication circuitry 206 comprise software and/or firmware that, in addition to being configured such that it is capable of implementing the methods to be described, is configured to control the general operation of the RNC 200 when operating in a communication system such as the system 100 in FIG. 1. However, for the purpose of avoiding unnecessary detail, no further description will be made in the present disclosure regarding this general operation.

Figure 3:
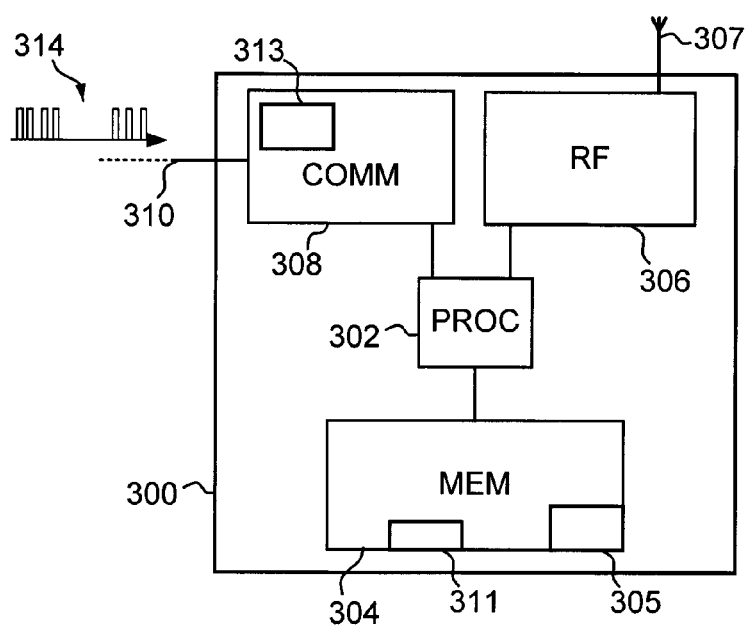
FIG. 3 illustrates schematically a radio network controller.

FIG. 3 is a functional block diagram that schematically illustrates an example of a radio base station, RBS, in the form of a Node B 300, corresponding to any of the Node Bs 106 in FIG. 1. The Node B 300 comprises radio frequency, RF, receiving and transmitting circuitry 306, an antenna 307 and digital data processing circuitry comprising a processor 302, a memory 304, and communication circuitry 308. The memory 304 comprises a buffer 311 for buffering data that is communicated with other entities. For example, the buffer 311 can hold MAC-PDUs in a priority queue as will be discussed in more detail below. The communication circuitry 308 includes a receiver 313 capable of receiving data from other entities in the network. Radio communication via the antenna 307 is realized by the RF circuitry 306 controlled by the processor 302, as the skilled person will understand. The circuitry of these means 302, 304, and 308 can comprise and/or form part of one or more application specific integrated circuit, ASIC, as well as one or more digital signal processor, DSP. The processor 302 makes use of software instructions 305 stored in the memory 304 in order to control functions of the Node B 300, including the functions to be described in detail below with regard to handling of PDUs. In other words, at least the communication circuitry 308, the processor 302 and the memory 304 form parts of digital data processing and communication circuitry that is configured to handle PDUs as summarized above and described in detail below. Further details regarding how these units operate in order to perform normal functions within a communication system, such as the system 100 of FIG. 1, are outside the scope of the present disclosure and are therefore not discussed further.

Figure 4:
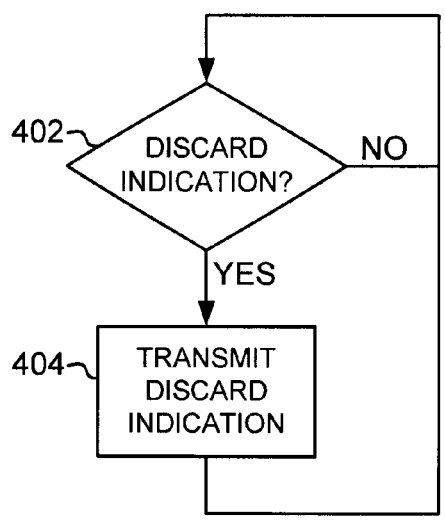
FIGS. 4 and 5 are flow charts of methods embodying the invention.
Figure 5:
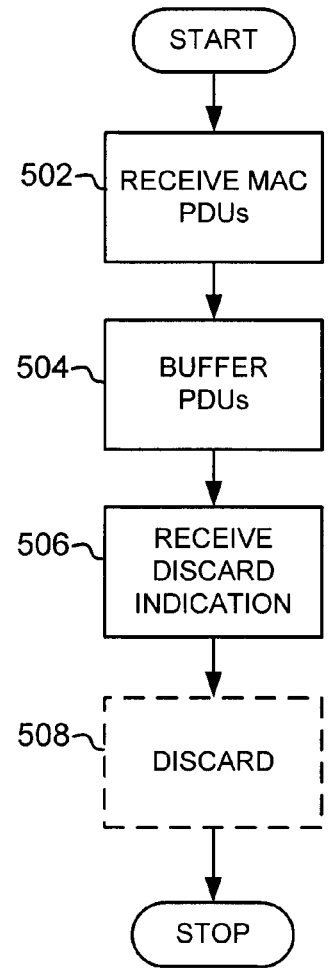

Turning now to FIGS. 4 and 5, and with continued reference to the previous figures, examples of methods associated with discarding of PDUs will be described in some more detail.

FIG. 4 describes a method in a RNC, such as any of the RNCs 105 in FIG. 1 and the RNC 200 in FIG. 2. FIG. 5 describes a method in a radio base station, RBS, or Node B, such as a Node B as illustrated by the Node Bs 104 in FIG. 1 and the node B 300 in FIG. 3. The methods of FIGS. 4 and 5 describe behaviour in separate interrelated products that facilitate a discard of redundant data queued in Node B before transmission over the air interface. In a MP HSDPA scenario (i.e. involving at least two Node Bs) there may due to RLC retransmissions be data in one or both Node B's that is redundant since it has already been received by UE. It should be noted that there may even be multiple copies of the same MAC-d PDU's in one or both Node B PQ's since the UE may via status reports send requests for additional retransmissions for data already queued in Node B but not yet transmitted. As soon a the UE has received this data via either Node B, all other copies are redundant and could preferably be cleared from the PQ's in order to make room for transmission of data that UE has yet not received.

By keeping track of what data has been sent in which TN (Transport Network) frame type 1 or 2 and by monitoring the RLC status reports sent by UE, the RNC knows when the UE has received which data and what data is therefore still in Node B awaiting transmission. Based on this information the RNC will thus know when to send discard indications to Node B. These discard indications may either be carried in new data or control frames scheduled for transmission or sent in dedicated frames devoid of data if no data is scheduled for transmission, as will be exemplified in more detail below. Since the RNC via the RLC status reports knows that the UE has received the data but is unaware of via which Node B, the discard indication can be sent to one or more of the Node B's. The Node B in turn reads the discard indication from the RNC and if such data is stored discards this. It should be noted that the RNC can keep track of to which Node B data has been sent and only send the discard indication to the Node B who has the redundant data.

FIG. 4 illustrates a method in a radio network controller according to an embodiment of the invention. The radio network controller is configured for MP-HSDPA operation wherein data is communicated to a first user equipment via at least two radio base stations. At step 402, a decision is made whether a discard indication signal should be sent. This decision may be based on the radio network controllers knowledge of which data has been received by the first user equipment derived from monitoring of RLC status reports sent by the first user equipment and providing acknowledgement status of RLC PDU's (where each RLC PDU corresponds to one MAC-d PDU). In a scenario where more than one MAC-d PDUs (and consequently more than one RLC PDU) may have been sent in a data frame, the decision may also be based on the radio network controllers knowledge of what data (i.e. MAC-d PDUs/RLC PDUs) have been sent in which data frame i.e. transport network frame. Hence, the decision whether a discard indication signal should be sent may be based on the radio network controllers knowledge of which data the UE has received and which data is still awaiting transmission derived by monitoring the RLC status reports sent by the first user equipment and keeping track of which data have been sent in which data frame.

If a discard indication should be sent (alternative "YES" at step 402), a discard indication signal is transmitted in a transmission step 404 to at least one of the at least two radio base stations. The discard indication signal includes a first data frame sequence number and indicates to the at least one radio base station that MAC-d PDUs received by the at least one radio base station from the radio network controller in a data frame associated with the first data frame sequence number can be discarded.

FIG. 5 illustrates a method in a radio base station (or Node B) according to an embodiment of the invention. The radio base station is configured to participate in MP HSDPA operation wherein data is communicated to a first user equipment via the radio base station and at least one other radio base station. Data is received, in a reception step 502, from the radio network controller. The received data is in the form of MAC-d PDUs in data frames, wherein each data frame conveying MAC-d PDUs is associated with a sequence number. The received MAC-d PDUs are buffered, in a buffering step 504, in a buffer pending transfer to the first user equipment. A discard indication signal is received, in a reception step 506, from the radio network controller. The discard indication signal includes a data frame sequence number and wherein the discard indication signal indicates to the radio base station that MAC-d PDUs received by the radio base station in a data frame associated with said sequence number can be discarded. At discard step 508, any MAC-d PDU still in the buffer and associated with said data frame sequence number in the discard indication signal may be discarded.

There are many different ways to indicate data to be discarded to Node B. That is, examples of how the discard indication signal can be realized will now be described with reference to FIGS. 6 to 11, where the examples include the use of reserved bits or assigning new meaning to already existing fields or defining new IE (Information Element) in either data or control frames of the type 1 and 2 HS-DSCH (High-Speed Downlink Shared Channel) Frame Protocol (FP). FIGS. 6 to 11 illustrate frame fields that are graphically emphasized by being hashed. Typically, in the following, the fields that are discussed in detail are those that are emphasized.

It should be noted that it may not be possible for Node B to discard all MAC-d PDU's as indicated in the discard message since some MAC-d PDU's may be partially transmitted or in the process of being transmitted. In some embodiments partially transmitted MAC-d PDU's and data moved from Node B PQ but still awaiting transmission on MAC-hs or MAC-ehs layer in Node B are excluded from deletion while in other embodiments also these MAC-d PDUs are discarded.

For example, a new sequence number, SN, specially related to the discard functionality is sent in every frame by utilizing the 15 of the 16 bits reserved to indicate "User Buffer Size" for this purpose.

In order to distinguish from the legacy use, the bit "0" in octet 4 reserved in both type 1 and type 2 FP is used. If the value of this bit is "0" then the legacy definition as "User Buffer Size" applies.

If this bit is set to "1" instead, then the Node B shall interpret this as an indication that all the 8 bits in octet 6 and bits 1 to 7 in octet 7 for type 1 FP indicate a SN. The last bit "0" in octet 7 is used to indicate how Node B shall interpret and use the associated SN. If this bit is set to "1" then the Node B shall store all MAC-d PDU's in contained in the frame and associate these with the SN. If this bit is set to "0", then the Node B shall discard all MAC-d PDU's associated with this SN. Note that for type 2 FP then the mapping is the same but octet 5 and 6 carry the "User Buffer Size" field.

This example provides an advantage in that the SN space is 32767 which in practice eliminates the risk of SN wrap around. Note that a solution using less of the 16 bits in the "User Buffer Size" is also possible but that this may lower the margin against SN wrap around. However, even if there in practice is no risk of a wrap around, it is of course still possible to implement a timer based flush as well that clears all stored data at timer expiry. An additional enhancement is to use another of the 16 bits in the "User Buffer Size" field to indicate that all data in PQ should be discarded. One possible embodiment in this case is again to use the last bit "0" in octet 4 reserved in both type 1 and type 2 FP. If the value of this bit is "0" then the legacy definition as "User Buffer Size" for octets 6 and 7 applies for type 1 FP. If this bit is set to "1" instead, then in this case the Node B shall interpret this as an indication that all the 8 bits in octet 6 and bits 2 to 7 in octet 7 indicate a SN for type 1 FP. This means that the SN space is reduced from 15 to 14 bits and the freed bit "1" would then be used to indicate that all buffered data is to be discarded if this is set to "1" or in the case that this bit is set to "0" indicate that the SN should be read and only data associated with this SN discarded. Note that for type 2 FP then the mapping is the same but octet 5 and 6 carry the "User Buffer Size" field.

Note that it is also possible to indicate discard even though no data is scheduled for transmission. In this scenario the RNC sends a frame with the same SN as previously sent but in this case containing no data but contain the discard indication as outlined above. For FP type 1, the value "0" to "NumOfPDU" is introduced to indicate that no data is contained in frame since range of is limited to 1-255 in current version of standard. For FP type 2 it is already possible with the current standard to indicate that no data is contained since range of "Total Number of PDU blocks" is 0-31.

In another example, the "New IE Flags" field is used to introduce the SN and indicate data to discard. This will in the following be illustrated by reference to 3GPP TS 25.435, V10.3.0 (2011 September) and how the coding of IEs can be modified in order to accommodate such examples.

With reference to FIG. 21A in 3GPP TS 25.435, V10.3.0, bit 1 of New IE Flags in HS-DSCH DATA FRAME TYPE 1 indicate if a SN is present (1) or not (0) in the third and the fourth octets following the New IE Flags IE. Bit 0 in the fourth octet is allocated for IE S/D. Bits 2 through 6 of New IE Flags in HS-DSCH DATA FRAME TYPE 1 shall be set to 0.

Field length of Spare Extension IE in HS-DSCH DATA FRAME TYPE 1 is 0-27 octets.

In terms of how the description of IE coding in 3GPP TS 25.435, V10.3.0, can be supplemented, the following addition can be made with regard to the frame sequence number, SN: SN is a sequence number assigned to each frame by RNC and shall be used by Node B to identify the set of MAC-d PDU's sent in frame. This is also used by RNC to indicate MAC-d PDU's that the Node B shall discard. The value range is {0 . . . 32767} and the field length is 15 bits.

With regard to the Store/Discard, S/D, indicator, it indicates if Node B shall store or discard data associated with SN. The value range is {0=Discard data associated with SN, 1=Store and associate MAC-d PDU's in frame with SN} and the field length is 1 bit.

Figure 6:
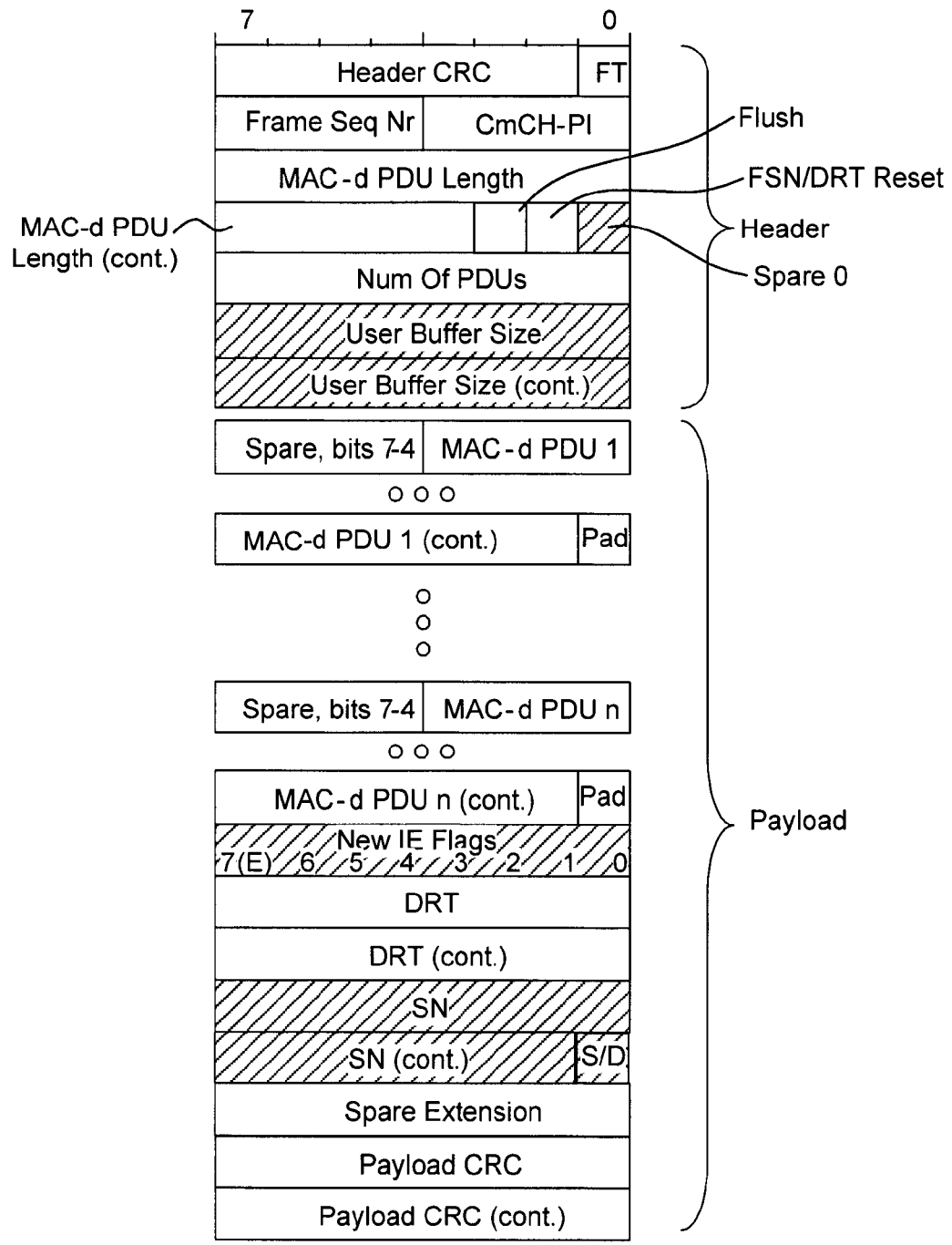
FIGS. 6 to 11 illustrate schematically content of data frames used for communication between entities in a mobile communication system.
Figure 7:
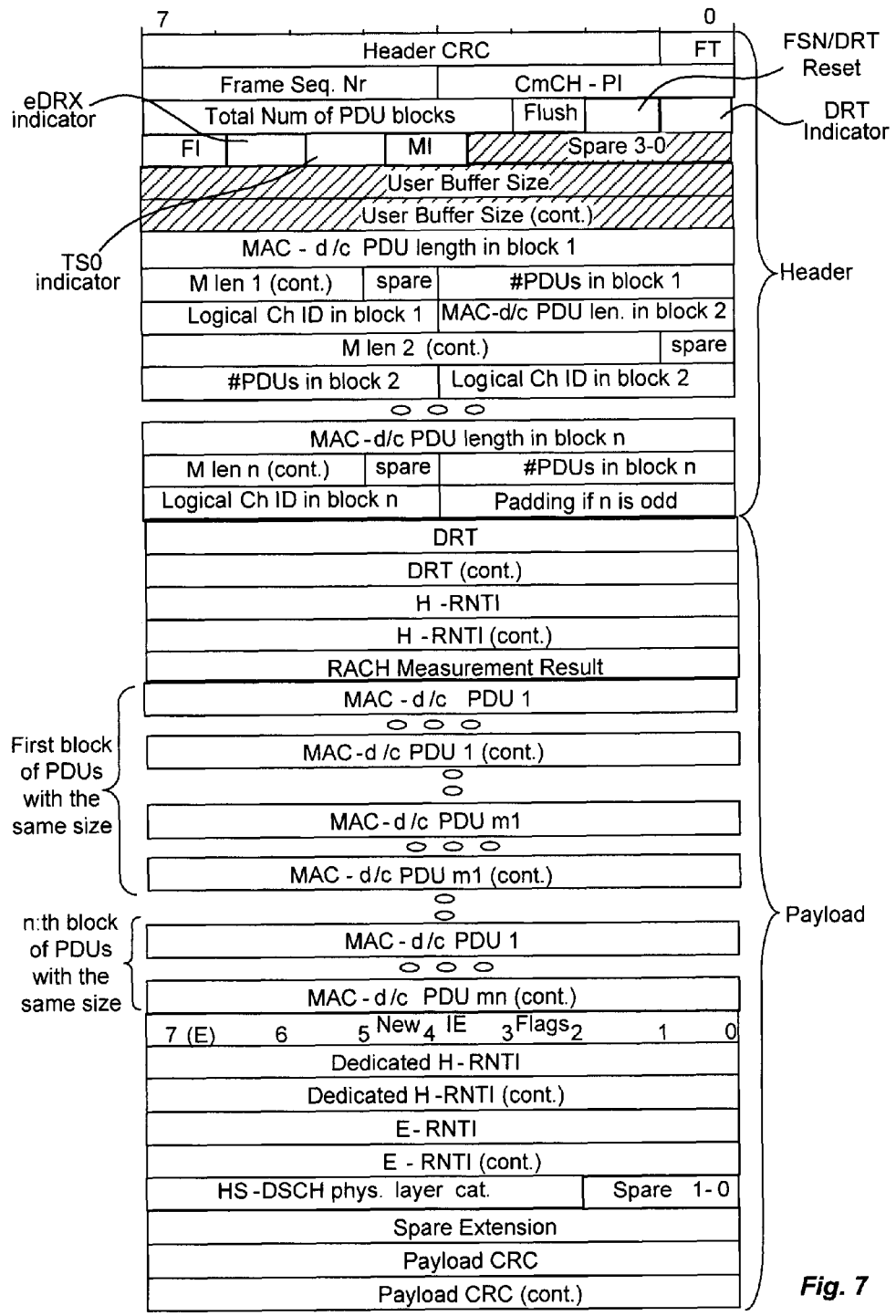

Such changes and additions are illustrated in FIG. 6 for FP type 1 and for FP type 2 in FIG. 7. Note that the same type of mapping using "New IE Flags" field as exemplified above for type 1 FP can also be done for type 2 FP but is not shown here.

Instead of using the spare bit in the FRAME TYPE header, (bit 0 in the fourth Octet), as exemplified above, it is also possible to define a new IE MP to indicate to the Node B if the "User Buffer Size" is defined as legacy or defined as SN. Similar change can apply to Type 2 (not illustrated).

Figure 8:
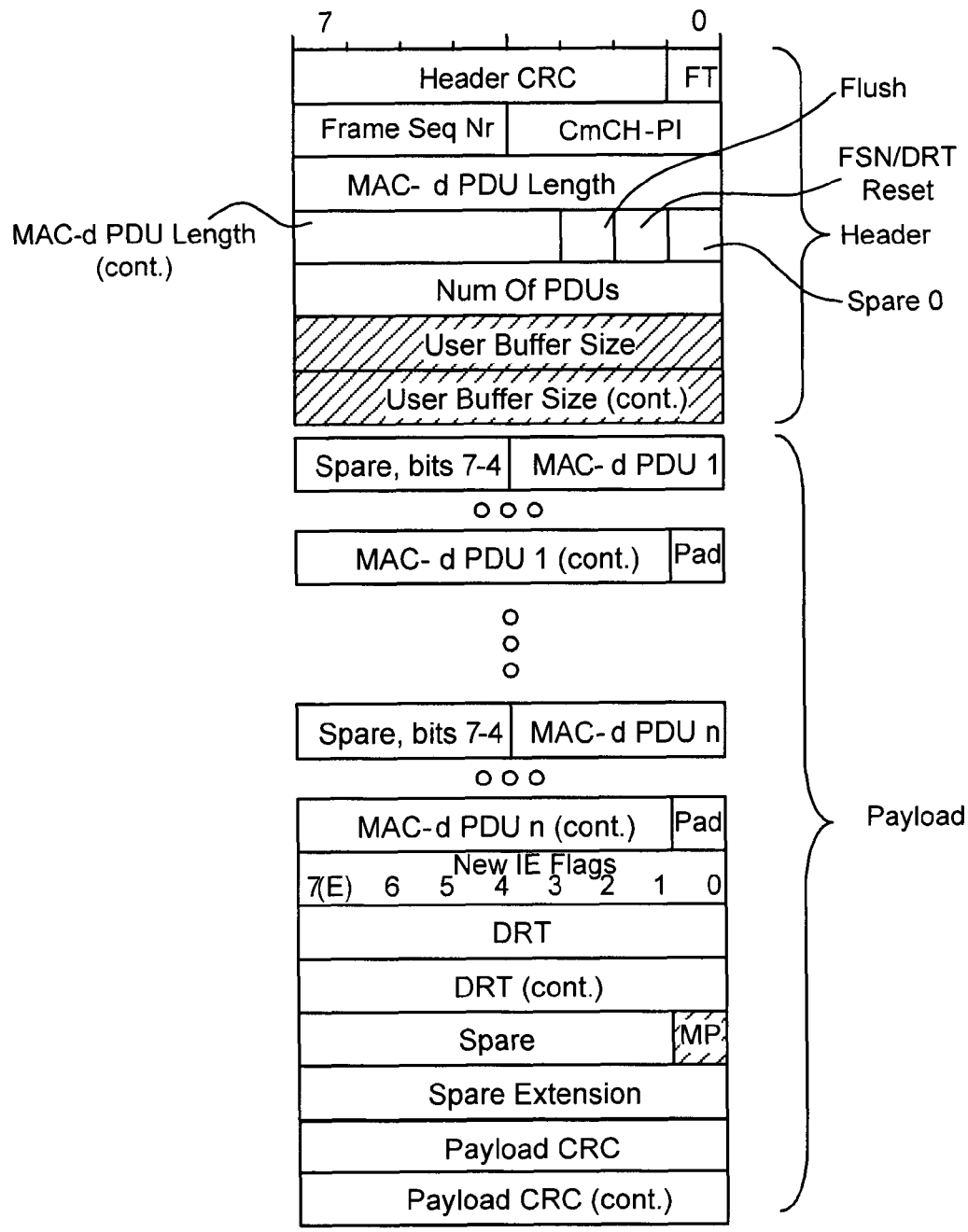

Now with reference to FIG. 8, it is also possible to supplement the IE coding by having bit 1 of New IE Flags in HS-DSCH DATA FRAME TYPE 1 indicate if a MP is present (1) or not (0) in the third octets below the New IE Flags IE. Bits 2 through 6 of New IE Flags in HS-DSCH DATA FRAME TYPE 1 shall be set to 0. In such cases, the field length of Spare Extension IE in HS-DSCH DATA FRAME TYPE 1 is 0-28 octets.

Furthermore, the IE coding can be supplemented by the addition of an MP indicator. MP is a 1 bit indicator for Multi Point related operation. A value of 0 means the User Buffer Size is defined as legacy; a value of 1 means the "user buffer size" is defined as SN. The value range is {0 . . . 1} and the field length is 1 bit.

Figure 9:
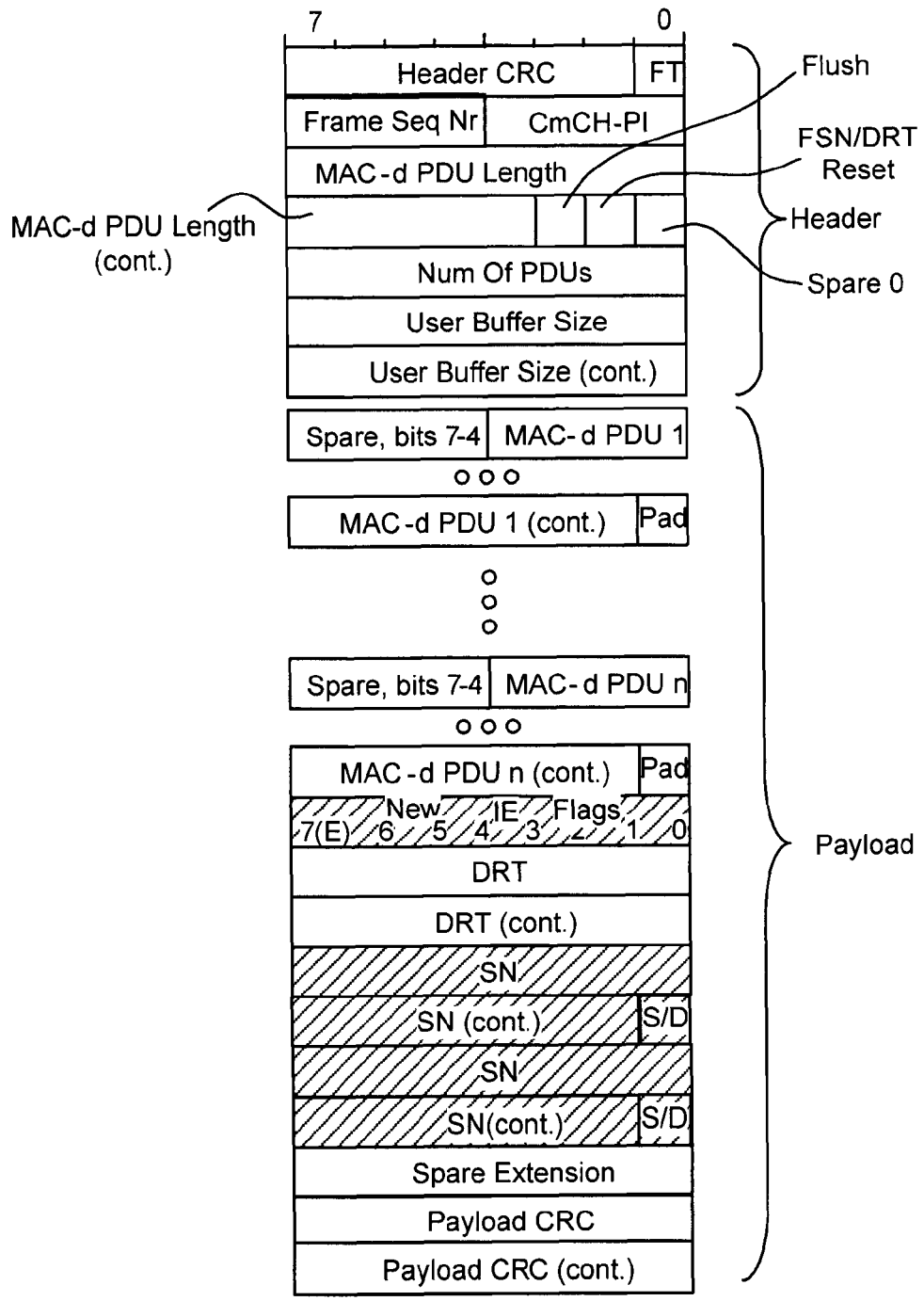

Further examples include those where a HS-DSCH data frame carries both new data and an indication to discard data in the same frame. Hence this would require that two SN and indication to discard is carried in the same frame which could be achieved e.g. by including two "New IE Flag" fields or one "New IE Flag" field in combination with the "User Buffer size" field. As an example, FIG. 9 illustrates a HS-DSCH data frame type 1 including two new SN fileds, in order to associate the MAC-d PDU(s) in the current frame with the one SN, and indicate which MAC-d PDU to discard in the Node B with the second SN.

Still further examples include those where use is made of control frames to allow RNC to indicate to Node B which SN to discard. The spare bit (bits) or new IE in the capacity request can be used to indicate if the Capacity, CA, Request (HS-DSCH Capacity Request) is legacy or if it is for discarding purpose. The SN to be discarded can be indicated either by reusing the existing "User Buffer Size" field or by introducing a new IE.

For example the reserved bits "4" to "7" in first octet in Capacity, CA, Request frame can be used. Currently bit "4" is set to "0". But if this bit is set to "1" then "User Buffer Size" in the 8 bits of the second octet and bit 7 to 1 of the third octets is used to carry SN to be discarded. Or if SN is introduced as a new IE, then SN indicated in the new SN filed should be discarded. It is interpreted by Node B that MAC-d PDU's associated with the SN shall be discarded from Node B.

In such examples, the Node B can be required to always associate the MAC-d PDU's stored in a type 1 or type 2 frame with the SN and store this data for possible future use (i.e. for discarding). The Node B does not need to reply back to the RNC with CA Allocation in this case to indicate to the RNC that the data has been discarded.

But it is possible if RNC wants to know that the data is discarded, the spare bits or new IE is defined in the CA Allocation (HS-DSCH Capacity Allocation) to fulfil this purpose.

Figure 10:
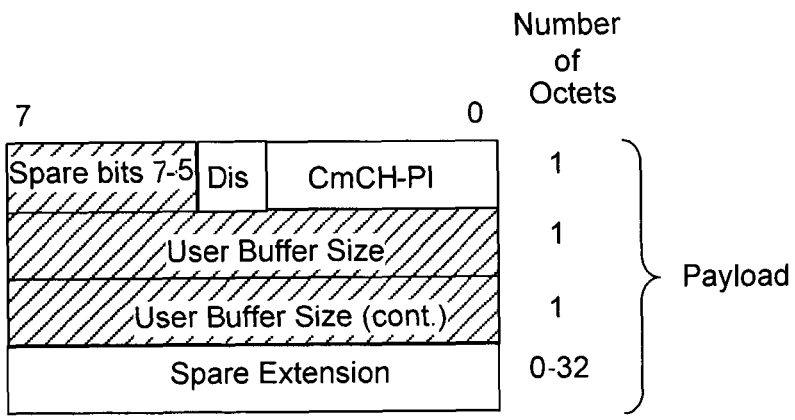

An example of a HS-DSCH Capacity (CA) Request, illustrated in FIG. 10, shows that bit 4 in the first Octet is used to indicate discarding function.

Dis, 1 bit, if it is set to 1, then User Buffer Size is used to carry SN to be discarded.

Figure 11:
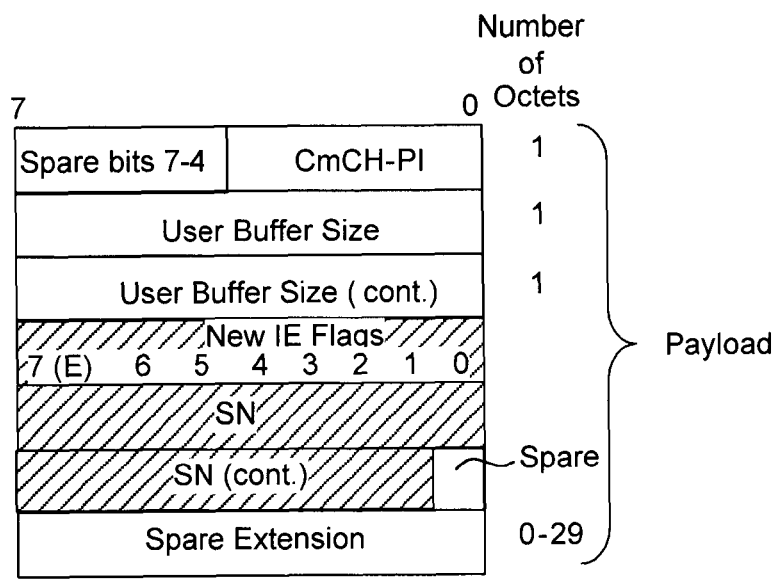

Another example of a HS-DSCH Capacity (CA) Request involves defining a new IE SN (15 bits or any other bits) in the HS-DSCH Capacity Request as illustrated in FIG. 11.

In the example of FIG. 11, Bit 0 of New IE Flags in CA Request indicates if SN is present (1) or not (0) in the two octets following the New IE Flags IE. Bits 1 through 6 of New IE Flags in CA Request frame shall be set to 0. Field length of Spare Extension IE in HS-DSCH Capacity Request is 0-29 octets.

Even further examples involves letting the RNC indicate to Node B which frame to discard in the Node B Application Part/Radio Network Subsystem Application Part, NBAP/RN- SAP, control plane signalling, once the HS-DSCH data frame is associated with SN and Node B has stored the information.

A new information element identifying sequence number(s) of MAC-d frames which could be discarded can be added to the existing NBAP/RNSAP signalling, for example in Radio Link Deletion Request. This way, the message is modified so that RNC can indicate to Node B that the purpose of the message is to discard the frame, and also include which SN to discard when Node B receives the message.

A new signalling with the SN identifier included can also be introduced in NBAP/RNSAP so that the RNC can indicate to Node B which SN to discard.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Other network elements, communication devices and/or methods according to embodiments of the invention will be or become apparent to one with skill in the art upon review of the present drawings and description. It is intended that all such additional network elements, devices, and/or methods be included within this description, be within the scope of the claims. Moreover, it is intended that all embodiments disclosed herein can be implemented separately or combined in any way and/or combination.

Although attempt has been made in the above to explain the abbreviations when first introduced below follows a list of most of the abbreviations used:
AMD Acknowledged Mode Data
FP Frame Protocol
HSDPA High Speed Downlink Packet Access
HS-DSCH High Speed Downlink Shared Channel
MAC Medium Access Control
MAC-d Medium Access Control protocol handling dedicated data
MAC-hs HSDPA Medium Access Control protocol handling fixed size RLC data
MAC-ehs HSDPA Medium Access Control protocol handling fixed or flexible sized RLC data
MP-HSDPA Multi Point High Speed Downlink Packet Access
NBAP Node B Application Part
PDU Protocol Data Unit
PQ Priority Queue
RLC Radio Link Control
RNC Radio Network Controller
Node B Radio Base Station (alternatively referred to as RBS)
RNSAP Radio Network Subsystem Application Part
SN Sequence Number
TN Transport Network
UE User Equipment
WCDMA Wideband Code Division Multiple Access

The invention claimed is:

1. A method in a radio network controller, said radio network controller configured for multi-point High Speed Downlink Packet Access, HSDPA, operation wherein data is communicated to a first user equipment via at least two radio base stations, the method comprising:
identifying a first data frame sequence number corresponding to data for the first user equipment that can be discarded at one or more of the at least two radio base stations; and
transmitting a discard indication signal to at least one of the at least two radio base stations, wherein the discard indication signal includes the first data frame sequence number and wherein the discard indication signal indicates to the at least one radio base station that Medium Access Control protocol handling dedicated data Protocol Data Units, MAC-d PDUs, received by the at least one radio base station from the radio network controller in a data frame associated with the first data frame sequence number can be discarded;

wherein identifying the first data frame sequence number comprises determining that one or more of the at least two radio base stations is buffering data for the first user equipment that is redundant because it has already been received by the first user equipment, and identifying the first data frame sequence number as the frame sequence number corresponding to the data frame associated with the redundant data.

2. The method according to claim 1, wherein the discard indication signal is a High Speed Downlink Shared Channel, HS-DSCH, DATA FRAME including the first data frame sequence number and a discard flag indicating that MAC-d PDUs received by the at least one radio base station in the data frame associated with the first data frame sequence number can be discarded.

3. The method according to claim 2, wherein the HS-DSCH DATA FRAME includes a New Information Element, IE, Flags field, wherein the New IE Flags field indicates that the discard flag and the first data frame sequence number are present in the HS-DSCH DATA FRAME and the discard flag and the first data frame sequence number are included in the third and fourth octets following the New IE Flags field.

4. The method of claim 1, wherein a decision to transmit the discard indication signals is based on knowledge of which data has been received by the first user equipment, as derived from monitoring of Radio Link Control, RLC, status reports sent by the first user equipment.

5. A radio network controller, said radio network controller configured for multi-point High Speed Downlink Packet Access, HSDPA, operation wherein data is communicated to a first user equipment via at least two radio base stations, the radio network controller comprising:
   digital data processing circuitry adapted to
      identify a first data frame sequence number corresponding to data for the first user equipment that can be discarded at one or more of the at least two radio base stations, and
      generate a discard indication signal for transmission to at least one of the at least two radio base stations, wherein the discard indication signal includes the first data frame sequence number and wherein the discard indication signal indicates to the at least one radio base station that Medium Access Control protocol handling dedicated data Protocol Data Units, MAC-d PDUs, received by the at least one radio base station from the radio network controller in a data frame associated with the first data frame sequence number can be discarded, and wherein the digital data processing circuitry is adapted to identify the first data frame sequence number based on determining that one or more of the at least two radio base stations is buffering data for the first user equipment that is redundant because it has already been received by the first user equipment, and identifying the first data frame sequence number as the frame sequence number corresponding to the data frame associated with the redundant data; and
   a transmitter operably connected to the digital data processing circuitry and adapted to transmit the generated discard indication signal to the at least one of the at least two radio base stations.

6. The radio network controller according to claim 5, wherein the discard indication signal is a High Speed Downlink Shared Channel, HS-DSCH, DATA FRAME including the first data frame sequence number and a discard flag indicating that MAC-d PDUs received by the at least one radio base station in the data frame associated with the first data frame sequence number can be discarded.

7. The radio network controller according to claim 6, wherein the HS-DSCH DATA FRAME includes a New Information Element, IE, Flags field, wherein the New IE Flags field indicates that the discard flag and the first data frame sequence number are present in the HS-DSCH DATA FRAME and the discard flag and the first data frame sequence number are included in the third and fourth octets following the New IE Flags field.

8. The radio network controller according to claim 6, wherein the discard flag and the first data frame sequence number are included in a header portion of the HS-DSCH DATA FRAME.

9. The radio network controller according to claim 5, wherein the discard indication signal is a control frame including the first data frame sequence number indicating that MAC-d PDUs received by the at least one radio base station in the data frame associated with the first data frame sequence number can be discarded.

10. A method in a radio network controller, said radio network controller configured for multi-point High Speed Downlink Packet Access, HSDPA, operation wherein data is communicated to a first user equipment via at least two radio base stations, the method comprising:
   identifying a first data frame sequence number corresponding to data for the first user equipment that can be discarded at one or more of the at least two radio base stations; and
   transmitting a discard indication signal to at least one of the at least two radio base stations, wherein the discard indication signal includes the first data frame sequence number and wherein the discard indication signal indicates to the at least one radio base station that Medium Access Control protocol handling dedicated data Protocol Data Units, MAC-d PDUs, received by the at least one radio base station from the radio network controller in a data frame associated with the first data frame sequence number can be discarded;
   wherein a decision to transmit the discard indication signals is based on knowledge of which data has been received by the first user equipment, as derived from monitoring of Radio Link Control, RLC, status reports sent by the first user equipment.

11. A radio network controller, said radio network controller configured for multi-point High Speed Downlink Packet Access, HSDPA, operation wherein data is communicated to a first user equipment via at least two radio base stations, the radio network controller comprising:
   digital data processing circuitry adapted to
      identify a first data frame sequence number corresponding to data for the first user equipment that can be discarded at one or more of the at least two radio base stations, and
      generate a discard indication signal for transmission to at least one of the at least two radio base stations, wherein the discard indication signal includes the first data frame sequence number and wherein the discard indication signal indicates to the at least one radio base station that Medium Access Control protocol handling dedicated data Protocol Data Units, MAC-d PDUs, received by the at least one radio base station from the radio network controller in a data frame associated with the first data frame sequence number can be discarded, and wherein a decision to transmit the discard indication signal is made by the digital data processing circuitry based on knowledge of which data has been received by the first user equipment, as derived from monitoring of Radio Link Control, RLC, status reports sent by the first user equipment; and a transmitter operably connected to the digital data processing circuitry and adapted to transmit the generated discard indication signal to the at least one of the at least two radio base stations.

* * * * *